United States Patent Office

Re. 25,264
Reissued Oct. 16, 1962

25,264
FATTY FOOD COMPOSITION

Lyle H. Berndt, Mundelein, and Orest Joseph Krett, Des Plaines, Ill., assignors to National Dairy Products Corporation, New York, N.Y., a corporation of Delaware No Drawing. Original No. 3,010,830, dated Nov. 28, 1961, Ser. No. 837,591, Sept. 2, 1959. Application for reissue June 7, 1962, Ser. No. 202,349
2 Claims. (Cl. 99—123)

Matter enclosed in heavy brackets [ ] appears in the original patent but forms no part of this reissue specification; matter printed in italics indicates the additions made by reissue.

This invention relates generally to a composition which can be whipped to provide a dessert topping and, more particularly, it relates to a water-fat emulsion which is suitable for whipping to provide the dessert topping.

Dessert topping has become a well known comestible with the advent of pressure containers, sometimes referred to as aerosol containers. These containers are filled with a water-fat emulsion, in the usual practice, and are placed under pressure with various innocuous gases, such as nitrogen, carbon dioxide, nitrous oxide, or mixtures thereof, which effect whipping of the emulsion upon passing through a valve in the top of the can to provide dessert topping which is not unlike whipped cream.

As indicated, there are many dessert toppings now being marketed and these are made in accordance with many formulae. One such formula is taught in Patent No. 2,622,984, another being taught in Patent No. 2,650,879. There are various other formulae and, in general, the formulae include an edible fat, water, a stabilizing agent, which is often a product derived from milk, an emulsifier, and suitable sweetening and flavoring agents.

These components must be suitably balanced in the formula so that there is not any separation of the fat and the whipped product is not subject to syneresis. It is necessary that the composition be stable at sterilizing temperatures and at refrigerator temperatures, while at the same time, being stable in flavor. In addition, the constituents of the composition should not separate out or break down when subjected to agitation which is inherent in handling and shipping of the composition to the consumer.

Furthermore, the valves which are used on the aerosol containers can, rather readily, plug up so that the consumer cannot dispense the mixture. This plugging up is a rather serious problem and can prevent the marketing of a satisfactory product. Any clumping or separation of the ingredients can cause this plug-up condition. It has been found quite difficult to overcome this plugging up when the mixture is subjected to the wide range of temperature conditions which are necessary to provide a satisfactory product, i.e. sterilizing temperatures and refrigerator temperatures.

It is desirable that the mixture be stable under gas pressure at acid pH values, i.e. pH values below about 6.5. It is desirable to use such lower pH conditions in order to provide increased stability against bacterial development. While previous formulae have provided results at higher pH values, they have not been altogether satisfactory at lower pH values.

It is a general object of this invention to provide a stable composition which can be used in the preparation of dessert topping and which has long keeping properties, both in respect of stability of the mixture against separation and against bacterial development.

It is a further object of this invention to provide a dessert topping composition which will maintain its stability even when subjected to sterilizing temperatures and refrigerator temperatures, and which has good flavor stability against separation and stability against bacterial development.

A further object of the invention is to provide an improved dessert topping which will readily dispense through the valves in aerosol containers and which has good stability against syneresis when whipped.

Still further objects and advantages of this invention will become apparent from the following description of the invention.

In general, the mixture of the present invention comprises an edible fat, an emulsifier, a gum type stabilizer and a mixture of sodium caseinate and calcium caseinate in suitable proportions. This mixture of the caseinates is one of the important features of the invention and it has been found necessary to provide calcium caseinate in order to assure the desired stability and to assure against plugging of the valves in the aerosol containers. The formula will not work with sodium caseinate alone as the casein constituent but it is necessary to have calcium caseinate present to give the desired result. The formula, of course, includes water.

The mixture of the invention can include various sweetening and flavoring agents. Furthermore, suitable coloring materials may be used to provide a product with the desired color.

The edible fat which is used in the mixture of the invention should be a fat which is stable and which is substantially tasteless. In this connection, the fat is desirably cocoanut oil, butter fat or hardened corn oil, peanut oil, or other fat which has been deodorized to remove any undesired characteristic flavor. The fat has a relatively low iodine value and, in this connection, the iodine value should be below about 40 but above about 5. The oil may be hydrogenated or hardened to provide a desired iodine value or stearene may be mixed with the oil to provide the desired iodine value.

The fat in the composition of the invention comprises from about 10 percent to about 45 percent *by weight*, of the composition. In general, the fat in presently marketed products comprises about 20 to 30 percent, *by weight*, of the dessert topping.

In order to provide the desired flavor stability and to provide the most satisfactory product, cocoanut oil is most desirably used and it is mixed with a stearene from cottonseed oil to provide the desired fat product for the composition of the invention.

An edible emulsifier is used and, in general, the most satisfactory emulsifier is an emulsifier having high monoglyceride content, i.e. more than about 50 percent monoglycerides. Such emulsifiers are readily available on the market and a successful emulsifier of this type is Atmul–124 which comprises 61 to 66 percent, *by weight, of* monoglyceride and has an iodine value of less than 2 The amount of emulsifier is in proportion to the fat which is present and, of course, in proportion to the emulsifying power of the emulsifier.

Generally, the emulsifier will be present in an amount of more than .5 percent and less than 5 percent, *by weight,* of the fat which is present. It will be understood, however, that other emulsifiers are within the skill of the art and can be used. Of course, the number of emulsifiers which can be used in an edible product are limited because they are subject to the approval of the Food and Drug Administration. Other emulsifiers which can be used, in accordance with this invention, are sold under the trade names listed below and have monoglyceride contents in excess of 50 percent, *by weight*:

Myverol-1800
Myverol-1807
Myverol-1885
Myverol-1890
Atmul-124
Atmul-122
Atmos-300

In order to provide stability, in accordance with this invention, a gum type stabilizer is used. Many different stabilizers may be employed but the gum stabilizer should have a viscosity in the range of from about 5 to about 35 centipoises and should have a gel strength in the range of from about 15 to about 35. A highly satisfactory stabilizer is carragheenin and an available product on the market is "Kraystay" (Type Z). Sodium alginate may also be used and others are known to those familiar with this art. The amount of stabilizer which is used will vary somewhat in proportion to the viscosity and gel strength but, in general, the stabilizer will be present in an amount of more than .15 percent and less than .5 percent, *by weight,* of the mixture.

As before indicated, the caseinates are an important feature of the invention and both sodium caseinate and calcium caseinate must be present to enjoy the features of this invention. In other words, neither sodium caseinate alone nor calcium caseinate alone will provide the desired stability and freedom of plugging up of the valves in the containers. The total amount of caseinates will be in the range of about 1 percent to about 3 percent, *by weight of the mixture,* and the *weight* ratio of sodium caseinate to calcium caseinate should be in the range of from about .5 to about 1.5, the preferred ratio being 1.

The pH of the composition of the invention will be in the range of from about 6.0 to about 6.8, it being preferably about 6.5. Such pH of the composition assures longer keeping time and improved product.

The sweetening agents which can be used are sucrose, glucose and dextrose and will be employed in a suitable amount to provide the desired sweetening of the mixture of the invention. It is important, however, that the sugar shall not crystallize in the mixture and this can be accomplished by reducing the amount of sucrose and increasing the amount of monosaccharide sugars.

As before pointed out, the mixture can be flavored as with vanilla or other flavoring agent. It can also be suitably colored and various coloring agents may be used.

To summarize the ingredients of the composition, *by weight*:

Fat—10 percent to 45 percent
Emulsifier—.5 percent to 5 percent of fat
Gum stabilizer—.15 percent to .5 percent
Total caseinates—1 percent to 3 percent
Ratio of sodium caseinate to calcium caseinate—.5 to 1.5
pH—6.0 to 6.8

In the manufacture of the composition of the invention, water is metered into a vat and heated, and the edible fat is added. The water and fat are heated, with agitation, to a temperature which effects melting of the fat. After the fat is melted in the water, the emulsifier is added and the temperature adjusted to assure melting of the emulsifier in the fat-water mixture. The gum stabilizer and caseinates are then added, along with the sweetening agent, if desired, while the agitation is continued. This mixture is then pasteurized and this can be done at 165° F. for thirty minutes. After pasteurization, the flavoring, such as vanilla, can be added.

The pasteurized composition is then homogenized and this can be done in a two stage homogenizer using 1500 p.s.i. in the first stage and 500 p.s.i. in the second stage. However, other homogenizing conditions may be adopted to provide the desired fat dispersion.

The homogenized composition is then cooled before filling and this can be done in various types heat exchangers, the mixture being preferably cooled at below about 40° F. The cooled mix is filled into a pressure container which is then closed. The container is filled wtih innocuous gas and placed under pressure in accordance with the usual practice. The cans are then packed.

In the manufacture of a particular product of this invention, 60 pounds of water was introduced into a vat and the water was heated to a temperature of about 140° F. Twenty-four pounds of cocoanut oil, having a melting point of 92° F., was added to the water, during agitation, and, at the same time, .24 pound of cottonseed oil stearene was added.

When the fat was completely melted in the water, .6 pound of a mixture of mono and di glycerides was added, the emulsifier being sold under the trade name "Atmul 124." At the same time a coloring agent was added, it being a beta carotene paste.

The composition was heated to 150° F. and to the heated composition was added 9.6 pounds of granulated sugar and 3.3 pounds of corn syrup solids, along with .2 pound of carragheenin having a viscosity of 20 centipoises and a gel of 25. In addition, one pound of sodium caseinate and one pound of soluble calcium caseinate were added to mixture. The temperature of the mixture was about 165° F. and after the dry ingredients were blended and this temperature was maintained for thirty minutes to assure pasteurization.

Vanilla extract was added for flavoring purposes.

The pasteurized mix was introduced into a circulating pump and pumped to a double stage homogenizer and was homogenized in the first stage at a pressure of 1500 p.s.i. and in the second stage at a pressure of 500 p.s.i. From the homogenizer the mixture was passed through a plate cooler and cooled to 35° F. From the plate cooler the mixture was introduced into a surge tank and filled into a pressure can. The can was closed and was placed under a pressure of about 110 p.s.i. with a gas mixture comprising 85 percent nitrous oxide and 15 percent carbon dioxide.

As before pointed out, one of the important features of this invention is the establishment of a particular ratio between the sodium caseinate and the calcium caseinate in the composition of this invention. In the foregoing description, it has been pointed out that the sodium caseinate and calcium caseinate are added as such. However, they may be formed in connection with the preparation of the composition of the invention when dry casein is used as a raw material. In this connection, it is known that casein can be reacted with sodium bicarbonate and that casein can be dissolved in calcium hydroxide. It will be understood that the use of dry casein and reacting it to provide sodium and calcium caseinates is within the scope of this invention.

The composition of this invention has excellent stability and has withstood shipping, shaking and various market tests. The product has been successfully marketed and has had excellent reception. It is believed that these tests indicate the excellent stability of the product. As before indicated, the use of sodium caseinate alone and the use of calcium caseinate alone in the composition did not provide satisfactory results in the tests.

The various features of this invention which are believed to be new are set forth in the following claims.

What is claimed is:

1. A composition comprising, in combination, a fat having an iodine value [between about 5 and about 15]

*below about 40 but above about 5,* the fat being present in an amount of from about 10 percent to about 45 percent, an emulsifier containing more than about 50 percent monoglyceride, the emulsifier being present in an amount of from about .5 percent to about 5.0 percent of the fat, gum stabilizer in the amount of from about .15 percent to about .5 percent, sodium and calcium caseinates in the amount of from about 1 to about 3 percent, the ratio of sodium caseinate to calcium caseinate being in the range of from about .5 to about 1.5.

2. A composition comprising, in combination, a fat having an iodine value [between about 5 and about 15] *below about 40 but above about 5,* the fat being present in an amount of from about 10 percent to about 45 percent, an emulsifier containing more than about 50 percent monoglyceride, the emulsifier being present in an amount of from about .5 percent to about 1.5 percent of the fat, gum stabilizer in the amount of from about .15 percent to about .5 percent, sodium and calcium caseinates in the amount of from about 1 to about 3 percent, the ratio of sodium caseinate to calcium caseinate being in the range of from about .5 to about 1.5, and the pH being in the range of between about 6.0 to about 6.8.

References Cited in the file of this patent or the original patent

UNITED STATES PATENTS

| | | |
|---|---|---|
| 1,609,617 | Frohring | Dec. 7, 1926 |
| 2,487,698 | Diamond | Nov. 8, 1949 |
| 2,868,653 | Diamond et al. | Jan. 13, 1959 |